US011281977B2

(12) United States Patent
Hodjat et al.

(10) Patent No.: US 11,281,977 B2
(45) Date of Patent: Mar. 22, 2022

(54) TRAINING AND CONTROL SYSTEM FOR EVOLVING SOLUTIONS TO DATA-INTENSIVE PROBLEMS USING EPIGENETIC ENABLED INDIVIDUALS

(71) Applicant: Cognizant Technology Solutions U.S. Corporation, College Station, TX (US)

(72) Inventors: Babak Hodjat, Dublin, CA (US); Hormoz Shahrzad, Dublin, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 905 days.

(21) Appl. No.: 16/049,584

(22) Filed: Jul. 30, 2018

(65) Prior Publication Data

US 2019/0034804 A1 Jan. 31, 2019

Related U.S. Application Data

(60) Provisional application No. 62/539,417, filed on Jul. 31, 2017.

(51) Int. Cl.
*G06G 7/60* (2006.01)
*G16B 20/20* (2019.01)
(Continued)

(52) U.S. Cl.
CPC ......... *G06N 3/126* (2013.01); *G05B 13/0265* (2013.01); *G06Q 10/00* (2013.01);
(Continued)

(58) Field of Classification Search
CPC .... G06N 3/126; G06N 3/008; G05B 13/0265; G06Q 10/00; G06F 16/23; G06F 16/2465; G06F 2216/03
(Continued)

(56) References Cited

U.S. PATENT DOCUMENTS 5,845,266 A 12/1998 Lupien et al.
5,920,848 A 7/1999 Schutzer et al.
(Continued)

FOREIGN PATENT DOCUMENTS

EP 2422276 2/2012
EP 2422278 2/2012
(Continued)

OTHER PUBLICATIONS

Stanley et al., "Evolving Neural Networks through Augmenting Topologies," Evolutionary Computation, 2002 The Massachusetts Institute of Technology, pp. 99-127.
(Continued)

*Primary Examiner* — Brandon S Cole
(74) *Attorney, Agent, or Firm* — Dawn-Marie Bey; Bey & Cotropia PLLC

(57) ABSTRACT

Roughly described, a computer-implemented evolutionary system evolves candidate solutions to provided problems. It includes a memory storing a candidate gene database containing active and epigenetic individuals; a gene pool processor which tests only active individuals on training data and updates their fitness estimates; a competition module which selects active individuals for discarding in dependence upon both their updated fitness estimate and their testing experience level; and a gene harvesting module providing for deployment selected ones of the individuals from the gene pool. The gene database has an experience layered elitist pool, and individuals compete only with other individuals in their same layer. Certain individuals are made epigenetic in the procreation module, after which they are not subjected to testing and competition. Epigenetic individuals are retained in the candidate gene pool regardless of their fitness. An epigenetic individual can become an active individual by random chance in procreation.

20 Claims, 12 Drawing Sheets

(51) Int. Cl.

| | | |
|---|---|---|
| *A61B 5/024* | (2006.01) | |
| *G06Q 10/00* | (2012.01) | |
| *G16C 20/60* | (2019.01) | |
| *G06N 3/12* | (2006.01) | |
| *G05B 13/02* | (2006.01) | |
| *G06F 16/23* | (2019.01) | |
| *G06F 16/2458* | (2019.01) | |
| *G06N 3/00* | (2006.01) | |

(52) U.S. Cl.
CPC .......... *G06F 16/23* (2019.01); *G06F 16/2465* (2019.01); *G06F 2216/03* (2013.01); *G06N 3/008* (2013.01)

(58) Field of Classification Search
USPC ....................................................... 706/1–62
See application file for complete search history.

(56) References Cited

U.S. PATENT DOCUMENTS

| | | | |
|---|---|---|---|
| 6,240,399 B1 | 5/2001 | Frank et al. | |
| 6,249,783 B1 | 6/2001 | Crone et al. | |
| 7,013,344 B2 | 3/2006 | Megiddo | |
| 7,370,013 B1 | 5/2008 | Aziz et al. | |
| 7,444,309 B2 | 10/2008 | Branke et al. | |
| 8,527,433 B2 | 9/2013 | Hodjat et al. | |
| 8,909,570 B1 | 12/2014 | Hodjat et al. | |
| 8,977,581 B1 | 3/2015 | Hodjat et al. | |
| 9,002,759 B2 | 4/2015 | Hodjat et al. | |
| 9,256,837 B1 | 2/2016 | Hodjat et al. | |
| 2002/0019844 A1 | 2/2002 | Kurowski et al. | |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0187848 A1 | 8/2005 | Bonissone et al. | |
| 2005/0198103 A1 | 9/2005 | Ching | |
| 2007/0016390 A1* | 1/2007 | Bernardo | G16B 20/20 703/11 |
| 2007/0143198 A1 | 6/2007 | Brandes et al. | |
| 2007/0143759 A1 | 6/2007 | Ozgur et al. | |
| 2007/0185990 A1 | 8/2007 | Ono et al. | |
| 2008/0071588 A1 | 3/2008 | Eder | |
| 2008/0163824 A1* | 7/2008 | Moser | G16B 20/20 119/174 |
| 2008/0228644 A1 | 9/2008 | Birkestrand et al. | |
| 2009/0125370 A1 | 5/2009 | Blondeau et al. | |
| 2009/0307638 A1 | 12/2009 | McConaghy | |
| 2010/0030720 A1 | 2/2010 | Stephens | |
| 2010/0182935 A1 | 7/2010 | David | |
| 2010/0274736 A1 | 10/2010 | Hodjat et al. | |
| 2010/0274742 A1 | 10/2010 | Hodjat et al. | |
| 2010/0293119 A1 | 11/2010 | Ferringer et al. | |
| 2011/0161264 A1 | 6/2011 | Cantin | |
| 2012/0239517 A1 | 9/2012 | Blondeau et al. | |
| 2013/0124440 A1 | 5/2013 | Hodjat et al. | |
| 2013/0254142 A1 | 9/2013 | Hodjat et al. | |
| 2014/0006316 A1 | 1/2014 | Hodjat et al. | |
| 2017/0233815 A1* | 8/2017 | Timmons | C12Q 1/6883 506/9 |
| 2017/0316148 A1* | 11/2017 | Lichtarge | G16C 20/60 |
| 2018/0313846 A1* | 11/2018 | Lindner | G01N 33/96 |

FOREIGN PATENT DOCUMENTS

| | | |
|---|---|---|
| JP | 08/110804 | 4/1996 |
| JP | 2001325041 | 11/2001 |
| JP | 2003044665 | 2/2003 |
| JP | 2004240671 | 8/2004 |
| JP | 2004302741 | 10/2004 |
| JP | 2007207173 | 8/2007 |
| JP | 2007522547 | 8/2007 |
| WO | WO 2005/073854 | 8/2005 |
| WO | WO 2010/127039 | 11/2010 |
| WO | WO 2010/127042 | 11/2010 |

OTHER PUBLICATIONS

Fernandez et al., "Genome-wide Enhancer Prediction from Epigenetic Signatures Using Genetic Algorithm-Optimized Support Vector Machines," Nucleic Acids Research, Feb. 10, 2012, vol. 40, No. 10, pp. 1-12.
La Cava et al., "Inheritable Epigenetics in Genetic Programming," Genetic Programming Theory and Practice XII, Genetic and Evolutionary Computation, Springer International Publishing Switzerland 2015, pp. 37-51.
U.S. Appl. No. 13/358,381—Office Action dated Jul. 8, 2014, 30 pages.
Freitas, A., "A review of evolutionary algorithms for data mining," Soft Computing for Knowledge Discovery and Data Mining, Springer US, 2008, pp. 79-111.
U.S. Appl. No. 13/540,507—Office Action dated Sep. 9, 2014, 25 pages.
Bongard, J. C. et al., "Guarding Against Premature Convergence while Accelerating Evolutionary Search", GECCO'10: Proceedings of the 12th annual conference on Genetic and Evolutionary Computation, 8 pages (2010).
Hornby, Gregory S.; "The Age-Layered Population Structure (ALPS) Evolutionary Algorithm"; 2009; ACM; GECCO '09; 7 pages.
Gaspar-Cunha, A. et al., "A Multi-Objective Evolutionary Algorithm Using Neural Networks to Approximate Fitness Evaluations," Int'l J. Computers, Systems and Signals, 6(1) 2005, pp. 18-36.
Kosorukoff, A. "Using incremental evaluation and adaptive choice of operators in a genetic algorithm," Proc. Genetic and Evolutionary Computation Conference, GECCO—Sep. 2002, 7pp.
Nelson, A. "Fitness functions in evolutionary robotics: A survey and analysis," Robotics and Autonomous Systems 57 (Apr. 30, 2009) 345-370.
Wu, A.S. et al., "An incremental fitness function for partitioning parallel taks," Proc. Genetic and Evolutionary Computation Conf. (Aug. 2001) 8pp.
Whitehead, B.A. "Genetic Evolution of Radial Basis Function Coverage Using Orthogonal Niches," IEEE Transactions on Neural Networks, 7:6, (Nov. 1996) 1525-28.
Bui L.T. et al., "Local models: An approach to distributed multi-objective optimization," Computational Optimization and Applications, vol. 42, No. 1, Oct. 2007, pp. 105-139.
Castillo Tapia M.G. et al., "Applications of multi-objective evolutionary algorithms in economics and finance: A survey," Proc. IEEE Congress on Evolutionary Computation, Sep. 2007, pp. 532-539.
Ducheyne, E. et al., "Is Fitness Inheritance Useful for Real-World Applications?" Evolutionary Multi-Criterion Optimization, ser. LNCS 2631, Spring 2003, pp. 31-42.
Enee, Gilles et al., "Classifier Systems Evolving Multi-Agent System with Distributed Elitism," Proc. 1999 Congress on Evolutionary Computation (CER'99) vol. 3:Jul. 6, 1999, pp. 1740-1746.
Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.
Juille, H. "Evolution of Non-Deterministic Incremental Algorithms as a New Approach for Search in State Spaces," Proc. 6th Int'l Conf. on Genetic Algorithms, 1995, 8pp.
International Search Report dated Jul. 2, 2010 in PCT/US10/32847.
International Search Report dated Jun. 29, 2010 in PCT/US10/32841.
Sacks, J. et al. "Design and Analysis of Computer Experiments," Statistical Science 4:4, 1989, 409-435.
Torresen, J. "A Dynamic Fitness Function Applied to Improve the Generalisation when Evolving a Signal Processing Hardware Architecture," Proc. EvoWorkshops 2002, 267-299 (12 pp).
Bartlett II, J.E. et al., "Organizational Research: Determining Appropriate Sample Size in Survey Research," IT, Learning, and Performance Journal 19(1) Spring 2001, 8pp.
Fitzpatrick, J.M. et al., "Genetic Algorithms in Noisy Environments," Machine Learning 3: 101-120, May 1988.
JP 2010-533295, Office Action dated Apr. 16, 2013, 12 pages.

(56) References Cited

OTHER PUBLICATIONS

León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272,
López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.
Davarynejad, M. et al., "A Novel General Framework for Evolutionary Optimization: Adaptive Fuzzy Fitness Granulation," CEC Sep. 2007, 6pp.
Davarynejad, M. "Fuzzy Fitness Granulation in Evolutionary Algorithms for complex optimization," Master of Science Thesis, Ferdowsi Univ. of Mashhad, Jun. 2007, 30pp.
Salami, M. et al., "A fast evaluation strategy for evolutionary algorithms," Applied Soft Computing 2/3F (Jan. 2003) 156-173.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.
Mouret, J.B. et al., "Encouraging Behavioral Diversity in Evolutionary Robotics: An Empirical Study," MIT, Evolutionary Computation 20(1):91-133, 2012.
Myers, Raymond H. and Montgomery, Douglas C., Response Surface Methodology: Process and Product Optimization Using Designed Experiments, John Wiley and Sons, Inc., New York, 1995.
Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.
Georgilakis, P.S. "Genetic Algorithm Model for Profit Maximization of Generating Companies in Deregulated Electricity Markets," Applied Artificial Intelligence, Jul. 2009, 23:6,538-552.
Refaeilzadeh, P. et al., "Cross Validation" entry, Encyclopedia of Database Systems, eds. Özsu and Liu, Springer, 2009, 6pp.
Remde, S. et al. "Evolution of Fitness Functions to Improve Heuristic Performance," LION Dec. 8-10, 2007 II, LNCS 5313 pp. 206-219.
Sakauchi et al., UNIFINE: A Next Generation Financial Solution System of Nihon Unisys Ltd., Technology Review 'UNISYS,' Japan, Nihon Unisys Ltd., Feb. 28, 2006, vol 25, No. 4, pp. 14-15.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).
Tanev, I. et al., "Scalable architecture for parallel distributed implementation of genetic programming on network of workstations," J. Systems Architecture, vol. 47, Jul. 2001, pp. 557-572.
Laumanns, Marco et al.; "A Unified Model for Multi-Objective Evolutionary Algorithms with Elitism"; IEEE; pp. 46-53.
Ahn, Chang Wook et al.; "Elitism-Based Compact Genetic Algorithms"; 2003; IEEE; Transactions on Evolutionary Computation, vol. 7, No. 4; pp. 367-385.
Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.
Hornby, G.S., "A Steady-State Version of the Age-Layered Population Structure EA," Chapter 1 of Genetic Programming Theory and Practice VII, Riolo et al., editors, Springer 2009, 16pp.
Hornby, G.S., "Steady-State ALPS for Real-Valued Problems," GECCO'09, Montreal, Jul. 2009, Assoc. for Computing Machinery, 8pp.
Idesign lab, "ALPS—the Age-Layered Population Structure," UC Santa Cruz web article printed Mar. 17, 2011, 3 pp. (http://idesign.ucsc.edu/projects/alps.html).
Koza, J.R., "Genetic Programming: On the Programming of Computers by Means of Natural Selection," MIT Press (1992).

\* cited by examiner

TRAINING AND CONTROL SYSTEM FOR EVOLVING SOLUTIONS TO DATA-INTENSIVE PROBLEMS USING EPIGENETIC ENABLED INDIVIDUALS

CROSS-REFERENCE TO OTHER APPLICATIONS

This application claims the benefit of U.S. Provisional Patent Application No. 62/539,417, entitled, "DATA MINING TECHNIQUE WITH EPIGENETIC ENABLED INDIVIDUALS", filed on Jul. 31, 2017. The provisional application is incorporated by reference for all purposes.

The following patents are incorporated herein for their teachings: U.S. Pat. No. 8,909,570, issued 9 Dec. 2014, entitled "DATA MINING TECHNIQUE WITH EXPERIENCE-LAYERED GENE POOL"; U.S. Pat. No. 9,002,759, issued 7 Apr. 2015 entitled "DATA MINING TECHNIQUE WITH MAINTENANCE OF FITNESS HISTORY"; U.S. Pat. No. 8,977,581 issued 10 Mar. 2015, entitled "DATA MINING TECHNIQUE WITH DIVERSITY PROMOTION", and U.S. Pat. No. 9,256,837 issued 9 Feb. 2016, entitled "DATA MINING TECHNIQUE WITH SHADOW INDIVIDUALS".

FIELD OF THE INVENTION

The invention generally relates to a method and apparatus for finding solutions to various kinds of problems for better control of a target system, and more particularly, to an improved architecture and method for using evolutionary algorithms to find such solutions and for controlling the target systems.

BACKGROUND

Certain kinds of systems are designed to be controlled by an algorithm or other set of rules, which are hoped will control the system optimally. For example for an automatic power saver on a light switch which turns off a fluorescent light after a certain delay period after failing to sense activity in the room, there is an optimal delay period which is not too long (which would light an empty room) but not too short (because if someone enters the room shortly thereafter then energy would be wasted to re-start the light). For an engine to reach a target speed as quickly as possible it is possible to accelerate it too quickly, thereby overshooting the target and wasting time. For a robot being controlled to quickly cross a room, an algorithm can be developed which controls the robot to turn left or right in response to detecting obstacles. All of these systems and many more require an algorithm or set of rules to control them in order to optimally meet desired goals. For some of the problems, such as optimally controlling acceleration rate of an engine, the algorithm or rule can be determined intuitively or from known principles. For other types of problems, such as the fluorescent light turn-off delay or the algorithm for operating the robot, the optimal solution may not be obvious. For many of the latter kinds of problems, data science can be used to try to infer an optimal algorithm by analysis of a large amount of data. For the fluorescent light turn-off delay example, data might be collected on how often and for how long the room is empty on different days of the week at different times of the day, and these data can be used to infer an optimal set of rules. For the robot example, a large number of possible algorithms might be tried, with data being collected on how quickly each algorithm causes the robot to reach the far side of the room.

Large data sets can be used to help find solutions to problems in many different environments. For example, a healthcare environment may record clinical data, diagnoses and treatment regimens for a large number of patients, as well as outcomes, and these data can be used to develop an algorithm to predict clinical conditions or optimize treatment for any particular future patient. A business environment may record customer information such as who they are and what they do, and their browsing and purchasing histories, and these data can be used to develop an algorithm to predict an arbitrary customer's future behavior, or to target specific customers with relevant ads. A computer security environment may record a large number of software code examples that have been found to be malicious, and these data can be used to develop an algorithm to detect malicious code in incoming data packets.

There are many techniques for developing algorithms or rules based on very large data sets. These include for example support vector machines, regression analysis, neural networks, sequential minimal optimization, space mapping, and many others. The present discussion addresses specifically evolutionary techniques, such as genetic algorithms. Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. A number of solutions to the problem have been proposed. In one solution, convergence is slowed by increasing the mutation rate, mutation size or population size. Other solutions involve modifying the replacement strategy, modifying the fitness of individuals based on similarity to each other, and by spatially distributing individuals and restricting them to interact only with spatial neighbors. In yet another solution, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool).

When using genetic algorithms against a large database to find solutions to a problem, it may not be practical to test each individual against the entire database. The system therefore rarely if ever knows the true fitness of any individual. Rather, it knows only an estimate of the true fitness, based on the particular subset of data samples on which it has actually been tested. The fitness estimate itself, therefore, varies over time as the individual is tested on an increasing number of samples. It is in this kind of environment that embodiments of the present invention reside.

In an environment with multiple solution landscapes, the evolutionary system might generate some stepping stone individuals. Stepping stone individuals are individuals that do not necessarily have a high fitness estimate, but can have one or more critical parts of a future optimal individual. Despite their potential value, there is always a risk that before the stepping stone individual can be effectively utilized during procreation to create better individuals, they may get displaced by some other individuals that do not have the stepping stone individuals' critical parts but have marginally better fitness estimate. Considering only the fitness estimates of individuals during the evolution cannot ensure a diverse set of patterns or emergence of new patterns.

For example, in a healthcare embodiment, an individual diagnosing low blood pressure will have a lower fitness score than individuals diagnosing high blood pressure when tested on a subset of high blood pressure data samples. Therefore, if data samples are used for testing early in the testing process happen to be high blood pressure samples, there is a possibility that the competition module may prematurely discard the individual diagnosing low blood pressure from the candidate individual pool based on its low fitness score. The discarding of the latter individual could result in a loss of a solution, or part of a solution, thereby impeding progress toward a solution that is optimal.

SUMMARY

In the above-incorporated "DATA MINING TECHNIQUE WITH EXPERIENCE-LAYERED GENE POOL" application, roughly described, a computer-implemented evolutionary data mining system includes a memory storing a candidate gene database in which each candidate individual has a respective fitness estimate; a gene pool processor which tests individuals from the candidate gene pool on training data and updates the fitness estimate associated with the individuals in dependence upon the tests; and a gene harvesting module providing for deployment selected ones of the individuals from the gene pool, wherein the gene pool processor includes a competition module which selects individuals for discarding from the gene pool in dependence upon both their updated fitness estimate and their testing experience level. Preferably the gene database has an elitist pool containing multiple experience layers, and the competition module causes individuals to compete only with other individuals in their same experience layer.

Applicants have recognized, however, that in running the fitness based evolutionary methods, it is possible to have a population in a candidate gene database in which individuals become very similar to each other. This can occur due to fitness based selection of individuals leading to a population of candidate individuals all having a fitness estimate close to that of the fittest individual. This situation can lead to reduction of diversity in the candidate gene database eventually leading to premature convergence.

In order to address this type of situation, roughly described, a system can be arranged to retain genetic material from individuals from earlier generations by giving them a "free pass". Such retained material, referred to herein as epigenetic information, can encapsulate partial solutions from early stages of evolution. Epigenetic information does not participate in training or competition steps of the genetic algorithm, but occasionally can be re-introduced into the active gene pool by including it in the procreation step.

In various embodiments, active genetic material can be designated as epigenetic by random chance. In an embodiment, individuals are designated epigenetic in their entirety. In an embodiment in which an individual contains one or more rules, epigenetic designations can be made at the rule level. In a further embodiment in which rules contain conditions, epigenetic designations can be made at the condition level. Individuals designated as epigenetic do not participate in training or competition steps of the genetic algorithm. But during procreation, epigenetic traits can be inherited by random chance and, occasionally, can be switched back to active genetic material. In a rule-based system, this method can cause some rules to be preserved by tagging them as epigenetic material (make them inactive), so they can propagate independently of fitness and be resurrected randomly to participate on crafting better complex solutions. The technique enables improved operation of the genetic algorithm by preserving potentially valuable stepping stones that would otherwise have been discarded because the complete solution of a particular individual was inadequate.

In another embodiment, the individuals designated as epigenetic participate in testing. The gene pool processor tests the epigenetic designated individuals on training data and updates the fitness estimate associated with the individuals in dependence upon the tests. In a further embodiment, the epigenetic individuals are tested but they do not participate in the competition for selecting individuals for discarding from the gene pool. In such an embodiment, the experience level of the epigenetic individuals is not updated.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

Figure 1:
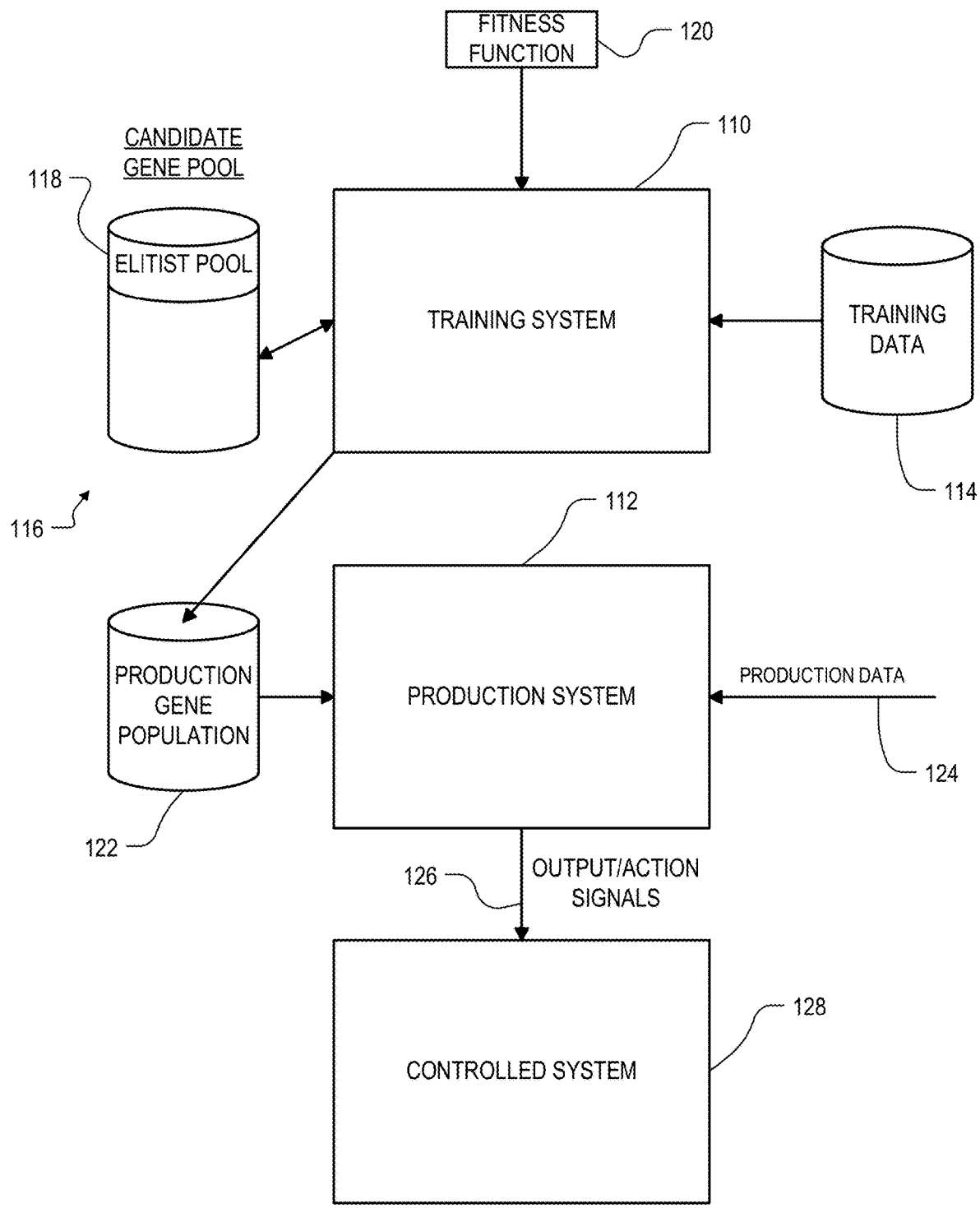
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. The action signals from an individual can be transmitted to the appropriate controlled system for execution.

One difference between the data mining environments of the embodiments described herein, and many other environments in which evolutionary algorithms can be applied, is that fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to this problem is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool.

However, the argument that high fitness values of individuals with less experience and could be due to luck rather than true fitness, also applies, though to a lesser degree, even to individuals within the elitist pool. That is, if compared to other individuals that have much more experience, younger, luckier individuals that have already entered the elitist pool could still displace individuals whose fitness levels are lower but more realistic. Again, allowing such individuals to compete against each other solely on the basis of fitness would continue to optimize for individuals that are lucky. The same solution can be applied to avoid this problem: divide the elitist pool into two layers on the basis of experience level. For example, layer 1 ($L_1$) may include only those individuals that have been tested on 1000-1999 samples, while a layer 2 ($L_2$) includes all individuals that have been tested on 2000 or more samples. Individuals compete only against other individuals within the same experience layer.

It will be appreciated that the tendency to optimize for lucky individuals still remains, within each layer, though to a still lesser degree. A solution is again the same: add more layers until the tendency to optimize for lucky individuals is reduced to a level sufficiently small for the particular application. In the extreme, each layer contains only those individuals having a single experience level, meaning only individuals that have been tested on exactly the same number of samples can compete against each other. This extreme may not be practical, however, as it can require a large amount of memory to maintain. Thus for a particular application, there will be an appropriate number of layers which minimizes the tendency to optimize for lucky individuals, yet remains practical to implement.

In general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in [$L_0$ ... $L_{T-1}$] contains only individuals with a respective range of testing experience [ExpMin($L_i$) ... ExpMax($L_i$)], each ExpMin($L_{i+1}$) >ExpMax($L_i$). The minimum experience level of the bottom layer $L_0$ is 0, and the top layer $L_T$ has a minimum experience level ExpMin($L_T$) but no maximum experience level. Preferably, the experience ranges of contiguous layers are themselves contiguous, so that ExpMin($L_{i+1}$)=ExpMax($L_i$)+1, for 0<=i<T. As used herein, if an individual is said herein to be "in" a particular layer, this is merely a shortcut way of saying that its testing experience level is within the range of testing experience levels of the particular layer.

Note that testing experience level is a significantly different basis on which to stratify individuals in an elitist pool than age in the sense of ALPS.

In an embodiment, each layer i in the elitist pool (i.e. in layers $[L_1 \ldots L_T]$) is permitted to hold a respective maximum number of individuals, Quota($L_i$). The quota is chosen to be small enough to ensure competition among the individuals within the corresponding range of experience levels, but large enough to ensure sufficient diversity among the fit individuals that graduate to the next higher layer. The quotas for all the layers may or may not be equal in different embodiments. Preferably the quota of each particular layer is fixed, but in another embodiment it could vary over time. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually be eligible to compete for entry into the next higher experience layer. In one embodiment, competition involves comparing the fitness estimate of the incoming individual to that of the least fit individual in the target experience layer. Whichever individual is less fit is discarded and the other is retained in the target layer. (See the above-incorporated DATA MINING TECHNIQUE WITH EXPERIENCE-LAYERED GENE POOL application.) In another embodiment, diversity of the gene pool is taken into account as well in the competition. (See the above-incorporated DATA MINING TECHNIQUE WITH DIVERSITY PROMOTION application.)

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, fitness, consistency, and so on.

Epigenetic Individuals

In embodiments herein, the candidate pool of individuals can include both active and epigenetic individuals. The epigenetic individuals include an epigenetic indication designating part or all of the individual as epigenetic. An "individual-level" epigenetic indication designates whether the whole individual is epigenetic. In a further embodiment, an individual includes at least one rule and each rule includes at least one condition. In such an embodiment, a "rule-level" epigenetic indication indicates which if any rules of the individual is epigenetic. A "condition-level" epigenetic indication indicates which if any conditions of the individual is epigenetic. Individuals in a candidate pool of individuals can have epigenetic designations at different levels. For example, a first individual can have a rule-level epigenetic indication designating a rule of the individual as epigenetic. A second individual can have a condition-level epigenetic indication designating a condition of the second individual as epigenetic.

In various embodiments, an individual can be designated as epigenetic by random chance. If an individual is designated epigenetic, it is withheld from competition. It gets a "free pass" and is retained in the candidate pool.

In one embodiment, before testing an individual from the candidate pool on the training data, the system checks whether the particular candidate individual is designated epigenetic. Only individuals that are not designated as epigenetic undergo testing. In embodiments, in which individuals have epigenetic indications at rule-level and condition-level, the epigenetic designated rules and conditions are not evaluated during testing. In one embodiment, in which an output of the individual depends on a combination of rules of the individual that "fire", a rule designated as epigenetic is precluded from firing. In an embodiment in which the conditions in an active rule are combined conjunctively, an epigenetic condition in an active rule can be ignored by forcing the condition to True. In another embodiment, the epigenetic designated individuals do undergo testing.

In one embodiment, the epigenetic individuals are not tested. Therefore their experience level remains at the same level as it was before the individual became epigenetic. In another embodiment, epigenetic individuals do undergo testing, though their experience level is not updated. Either way, should an epigenetic individual later become active, it will compete with other individuals in the same experience level where it was before the individual became epigenetic.

Example Embodiment

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate gene pool. As used herein, the term "database" does not necessarily imply any unity of structure. For example, two or more separate databases, when considered together, still constitute a "database" as that term is used herein. The candidate gene pool database 116 includes a portion 118 containing the elitist pool. The candidate gene pool includes both active and epigenetic individuals. The training system 110 operates according to a fitness function 120, which indicates to the training system 110 how to measure the fitness of an active individual. In the embodiment described herein, epigenetic individuals are not subjected to fitness evaluation. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In the healthcare domain, an individual might propose a diagnosis based on patient prior treatment and current vital signs, and fitness may be measured by the accuracy of that diagnosis as represented in the training data. As used herein, fitness may also include other target characteristics, such as diversity of candidate individuals.

The production system 112 operates according to a production gene population in another database 122. The production system 112 applies these individuals to production data 124, and produces outputs 126, which may be action signals or recommendations. In the healthcare domain, the production data 124 may be current patient data, and the outputs 126 of the production system 112 may be a suggested diagnosis or treatment regimen that one or more of the individuals in production gene population 122 outputs in response to the production data 124. The production gene population 122 is harvested from the training system 110 once or at intervals, depending on the embodiment. Preferably, only individuals from elitist pool 118 are permitted to be harvested. In an embodiment, further selection criteria is applied in the harvesting process.

The controlled system 128 is a system that is controlled automatically by the signals 126 from the production system. Depending on the application environment, the controlled system 128 may also include mechanical systems such as engines, air-conditioners, refrigerators, electric motors, robots, milling equipment, construction equipment, or a manufacturing plant.

In another embodiment, of the data mining system of FIG. 1, the training system 110 operates on production data rather than training data and there is no separate harvesting module or step. In such an embodiment, the training system 110 receives production data 124. The training system 110 applies individuals from top layer of the elitist pool 118 in the candidate gene pool 116 and produces outputs 126, which may be action signals or recommendations. In such an embodiment a separate training data 114 is not required. The controlled system 128 is controlled automatically by the signals 126 from the training system 110.

Figure 2:
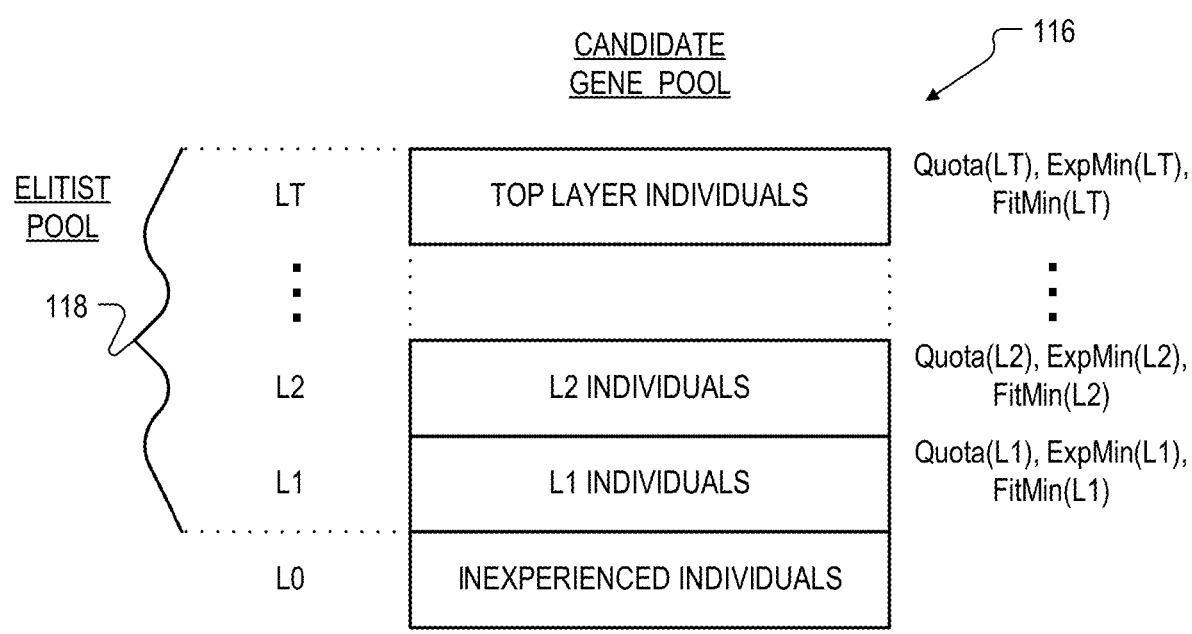
FIG. 2 is a symbolic drawing of the candidate gene pool in FIG. 1.

FIG. 2 is a symbolic drawing of the candidate gene pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The individuals in all layers include "active" individuals as described further below. Each layer contains epigenetic individuals according to their pre-epigenetic experience. The epigenetic individuals remain in their respective experience layer as their experience remains frozen at their respective pre-epigenetic level. When an epigenetic individual becomes active by random chance, it will undergo further testing which will increase its experience. Thus, graduating the individual to the next higher layers as other active individuals. The layers $L_1$ through $L_T$ constitute the elitist pool 118 (FIG. 1). Each layer i in the elitist pool 118 has associated therewith three "layer parameters": a quota Quota($L_i$) for the layer, a range of experience levels [ExpMin($L_i$) . . . ExpMax($L_i$)] for the layer, and the minimum fitness FitMin($L_i$) for the layer. The minimum experience level ExpMin($L_1$) may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In one embodiment, the quotas are larger in the lower layers and progressively decrease for higher layers. In addition, ExpMin($L_0$)=0 in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layers in candidate gene pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate gene pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate gene pool 116 using the SQL "insert" statement, and individuals being discarded can be deleted using the SQL "delete" statement. In another embodiment, the individuals in candidate gene pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list. Note that not all implementations of the technology disclosed require that the elitist pool be divided into experience layers. Epigenetic individuals are not discarded and get a "free pass".

Figure 3:
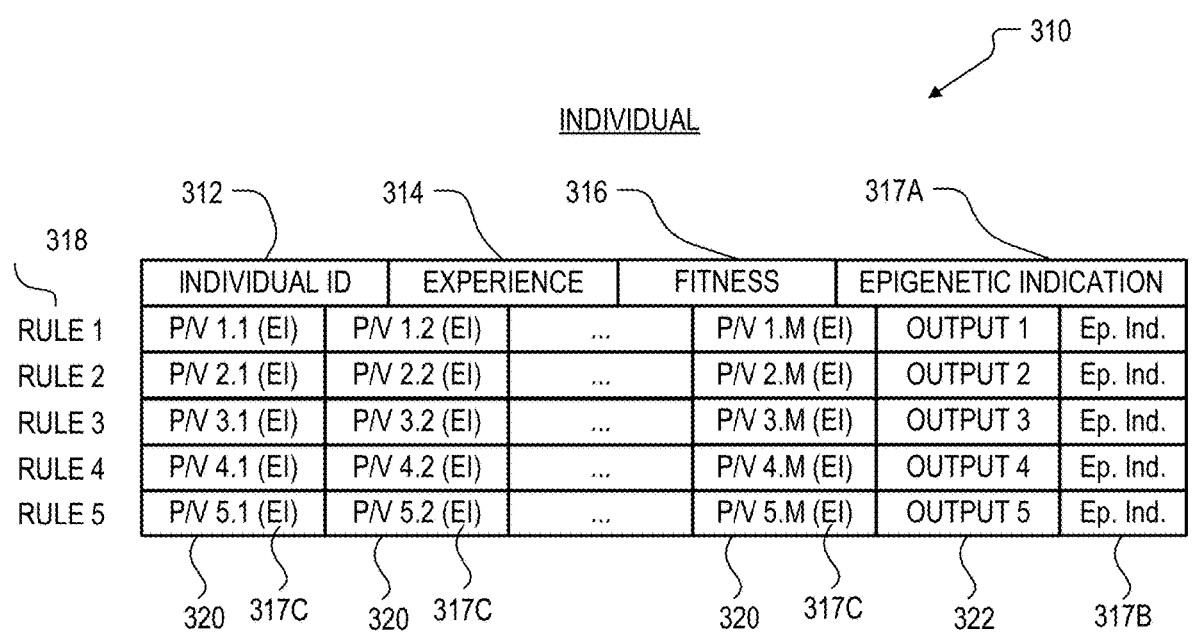
FIG. 3 is a symbolic drawing of an individual containing epigenetic indication in either the candidate gene pool or the production gene population of FIG. 1.

FIG. 3 is a symbolic drawing of an individual 310 in either the candidate gene pool 116 or the production gene population 122. As used herein, an "individual" is defined by its contents. An individual created by procreation is considered herein to constitute a different individual than its parents, even though it retains some if its parents' genetic material. In this embodiment, the individual identifies an ID 312, its experience level 314, its current fitness estimate 316, and its epigenetic indication 317A (also referred to herein as individual-level epigenetic indication). It also includes one or more "rules" 318, each of which contains one or more conditions 320, an output 322 to be asserted if all the conditions in a given sample are True, and an epigenetic indication 317B (also referred to herein as rule-level epigenetic indication). Each of the conditions 320 also includes an epigenetic indication 317C (also referred to herein as condition-level epigenetic indication). In one embodiment, the epigenetic indications 317A, 317B, and 317C are implemented as Boolean flags. If the value of the epigenetic indication 317A is True, the respective individual is considered as epigenetic. Otherwise, if the epigenetic indication 317A is false, the individual is considered as active. Epigenetic individuals, rules and conditions are ignored in fitness calculations. A false value of epigenetic indication Boolean flag implies the corresponding individual, rule or condition is active genetic material.

In one embodiment, epigenetic designations apply only at one of the above levels of granularity in an individual, for example at the rule level. In other embodiments, the epigenetic designations apply at two or more of the above levels of granularity. In one such embodiment, if a larger granularity object is designated as epigenetic, each of its contained finer granularity objects are automatically also designated as epigenetic. For example, if a rule is designated as epigenetic, all of its contained conditions will automatically be designated as epigenetic. Alternatively, in another such embodiment, if a larger granularity object is designated as epigenetic, that does not necessarily mean that each of its finer granularity components (rules or conditions) is considered epigenetic. Each component has its own epigenetic designation. Component of an individual, as used herein, refers to a part of an individual at any level of granularity, including the entire individual. In various embodiments, components can be at the individual, rule or condition level.

During procreation, any of the conditions or any of the outputs may be altered, or even entire rules may be replaced. The individual's experience level 314 increments by one for each sample of the training data 114 on which it is tested, and its fitness estimate 316 is determined by fitness function 120, averaged (or otherwise combined) over the all the trials.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is True. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

```
if pulse>=120 and 18<=blood pressure[6]<20 and temp >= 104 and
surgery duration < 22 and clamp on artery and medication = EB45 and
last
medication >= 60 and !white blood cell count [3] < -2.3 and !oxygen
level [1] < -1.1 -->>>
then thromboembolism @ prob <= 0.65
```

Returning to FIG. 1, the training data in the database 114 is arranged as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample.

Figure 4:
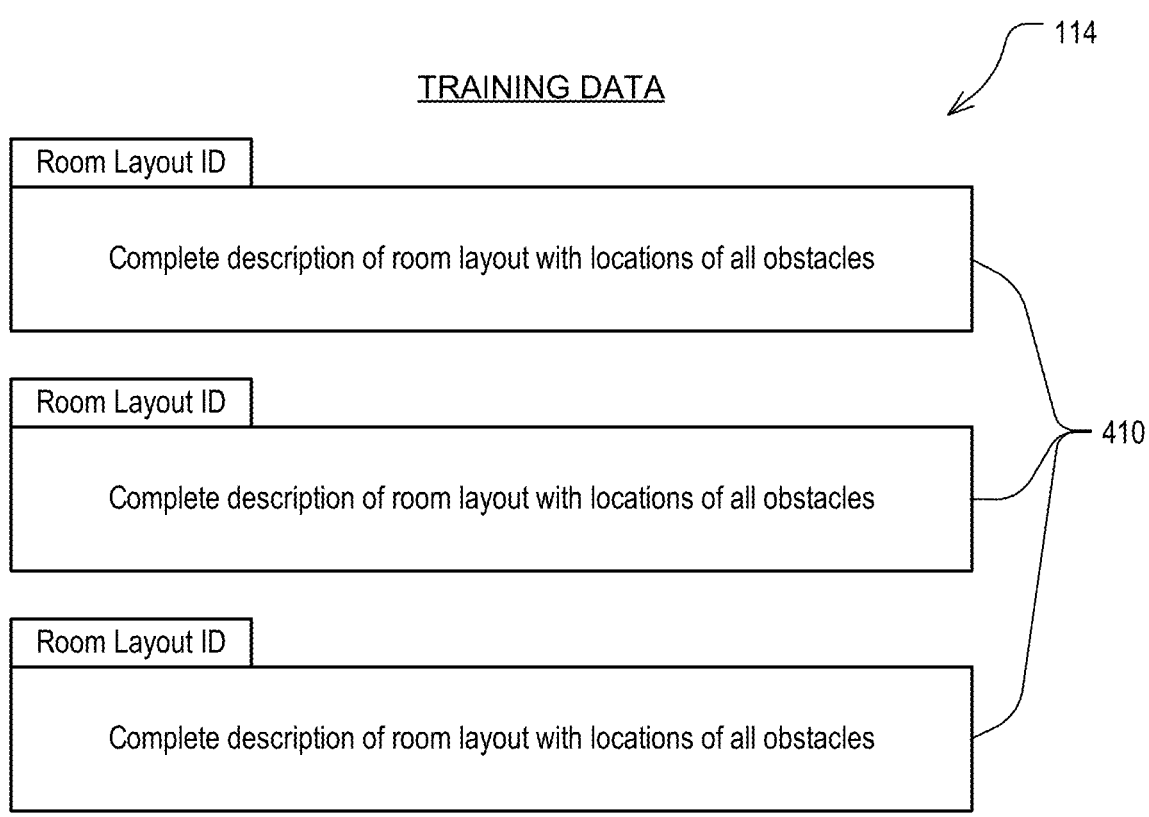
FIG. 4 is a symbolic drawing indicating how the training data database is organized according to an embodiment of the invention.

FIG. 4 is a symbolic drawing indicating how the training data can be organized in the database 114. The illustration in FIG. 4 is for an embodiment in which the problem is to find an algorithm for controlling a robot to cross a room most quickly, where the room layout can be different in each data sample. It will be understood how the embodiment can be modified for use in other environments. Referring to FIG. 4, three samples 410 are shown. Each sample includes a complete description of an example room layout with locations of all obstacles.

Figure 5:
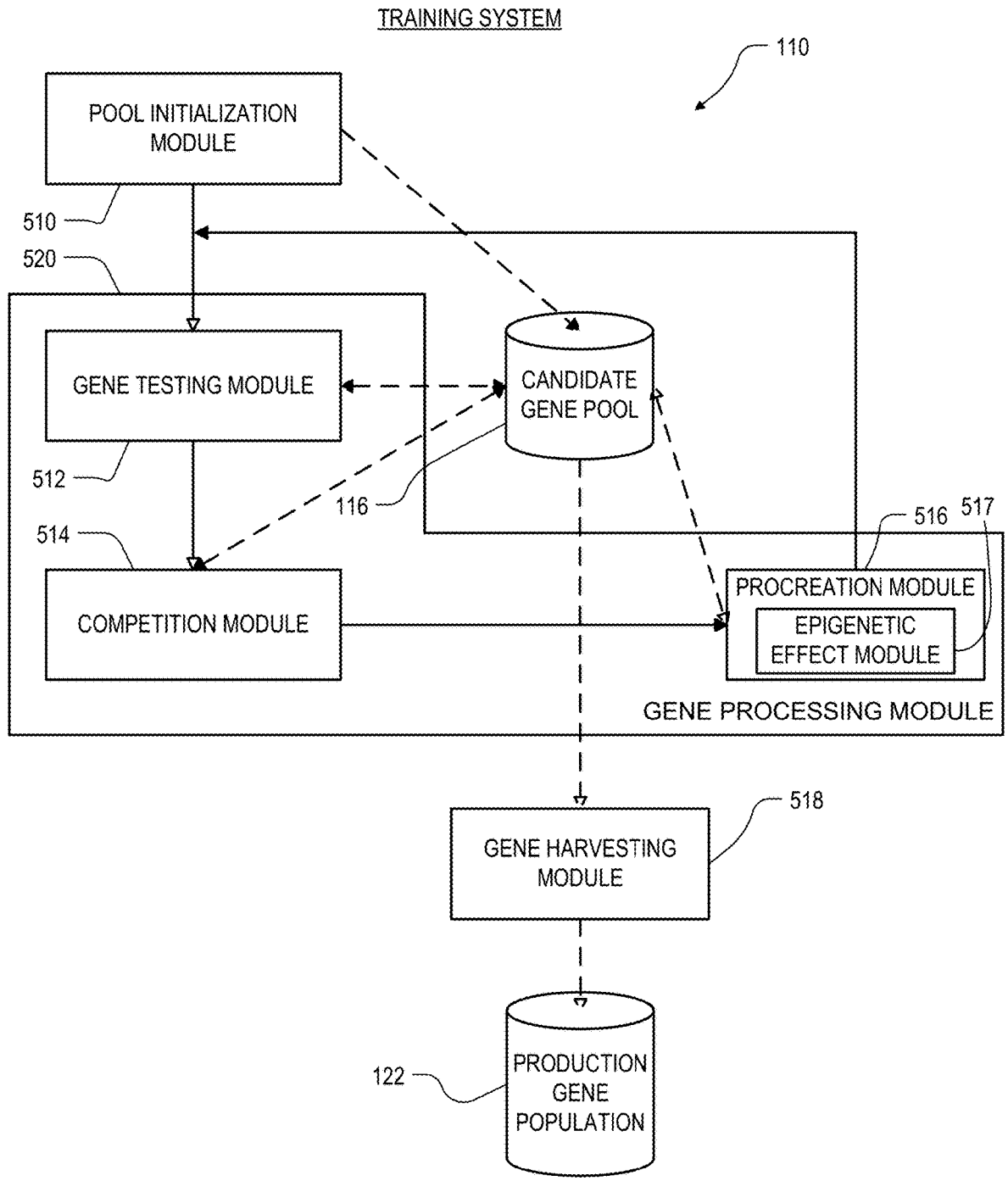
FIG. 5 illustrates modules that can be used to implement the functionality of the training system in FIG. 1.

FIG. 5 illustrates various modules that can be used to implement the functionality of training system 110 (FIG. 1). Candidate gene pool 116 and production gene population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "submodules", which themselves can be considered herein to constitute modules. In particular, the gene testing module 512, competition module 514, and procreation module 516 are also considered herein to be sub-modules of a gene pool processor module 520. The blocks in FIG. 5 designated as modules can also be thought of as flowchart steps in a method.

Referring to FIG. 5, the candidate gene pool 116 is initialized by pool initialization module 510, which creates an initial set of candidate individuals in $L_0$ of the gene pool 116. These individuals can be created randomly, or in some embodiments a priori knowledge is used to seed the first generation. In another embodiment, individuals from prior runs can be borrowed to seed a new run. At the start, all individuals are active individuals, and are initialized with an experience level of zero and a fitness estimate that is undefined. Later on, the gene pool 116 can also include epigenetic individuals.

Gene testing module 512 then proceeds to test the population in the gene pool 116 on the training data 114. Only active individuals having epigenetic indication 317A as false are tested. Further, for such active individuals, the rules that are active i.e. having epigenetic indications 317B as false are used in fitness estimation. Similarly, for each active rule, the conditions that are active are used in fitness estimation. Such conditions have values of respective epigenetic indications 317C as false. The epigenetic components of active individuals are ignored in testing. In one embodiment, the active individuals contain rules which further contain conditions. Epigenetic rules of active individuals are ignored in testing. In one embodiment, in which rule outputs are combined when they "fire", a rule designated as epigenetic is precluded from firing. In an embodiment in which the conditions in an active rule are combined conjunctively, an epigenetic condition in an active rule can be ignored by forcing the condition to True. Also, for the reasons explained above, only those active individuals that have not yet reached the top layer $L_T$ of the elitist pool 118 (of which there are none initially) are tested. Each such individual undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least ExpMin($L_1$) trials for each individual, to enable the initial individuals to qualify for consideration for the first layer of the elitist pool 118. Note there is no requirement that all individuals undergo the same number of trials. After the tests, gene testing module 512 updates the fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum. In other embodiments, the results of each testing battery are combined into the prior fitness estimate in a manner that avoids any increased influence of test samples that may have been used more than once.

Next, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, discards individuals that have been replaced in a layer by new entrants into that layer. Candidate gene pool 116 is updated with the revised contents. If an individual is designated as epigenetic, it is withheld from the competition. It gets a "free pass" and is retained in the candidate gene pool 116. Active individuals which have epigenetic indications 317A as false, compete with other active individuals in the same layer. This competition is not impacted by the presence of one or more epigenetic components in the active individual.

After the candidate gene pool 116 has been updated, a procreation module 516 evolves a random subset of them. Only individuals in the elitist pool are permitted to procreate. Further, only active individuals are selected for procreation. Epigenetic individuals do not participate in procreation. Any conventional or future-developed technique can be used for procreation. In an embodiment, conditions, outputs, rules, or epigenetic conditions from parent individuals are combined in various ways to form child individuals, and then, occasionally, they are mutated. In mutation, the Boolean flag values for epigenetic indications 317A, 317B, and 317C are also flipped using a predetermined probability value. The combination process for example may include crossover—i.e., exchanging conditions, outputs, or entire rules between parent individuals to form child individuals. The epigenetic rules in active individuals are treated as atomic components in this process. If an active individual has a rule designated as epigenetic (respective epigenetic indication 317B is True) and that rule is selected for participation in crossover, the entire epigenetic rule will be passed to the child. Finer granular components within an epigenetic rule are not passed to child individuals separately, only as part of the entire epigenetic rule. This is in contrast to crossover involving non-epigenetic rules in which finer granular components of a rule such as a condition may be passed to the child and combined with conditions of a second rule from a second parent to create a new rule in the child individual. In another embodiment, if the finer granularity component selected for crossover is epigenetic, then the system forces the entire larger granularity component to be selected for crossover instead. For example, if an epigenetic condition is selected for crossover, a rule containing the epigenetic condition, rather than only the epigenetic condition itself, is selected for passing to the child.

New individuals created through procreation begin with an experience level of zero and with a fitness estimate that is undefined. These individuals are placed in $L_0$ of the gene pool 116. Preferably, after new individuals are created by combination and/or mutation, the parent individuals are retained. In this case the parent individuals also retain their experience level and fitness estimates, and remain in their then-current elitist pool layers. In another embodiment, the parent individuals are discarded.

Epigenetic individuals, i.e., the individuals whose epigenetic indication 317A is True, do not participate in the normal procreation of active individuals as described above. However, they are randomly selected by an epigenetic effect module 517 for inversion of epigenetic indications 317A, 317B, or 317C. When an epigenetic indication on a component is flipped, it does not have any impact on epigenetic indications of its included components at finer granularity. The included epigenetic indications on the finer granularity components of this component remain the same i.e., the previously active components remain active and the previously epigenetic components remain as epigenetic.

After procreation, gene testing module 512 operates again on the updated gene pool 116. The process continues repeatedly.

Sometime after the top layer of elitist pool 118 is full, individuals can be harvested for use by production system 112. Gene harvesting module 518 retrieves active individuals for that purpose. In one embodiment, gene harvesting module 518 retrieves individuals periodically, whereas in another embodiment it retrieves individuals only in response to user input. Gene harvesting module 518 selects only from the top layer $L_T$, and can apply further selection criteria as well in order to choose desirable individuals. For example, it can select only the fittest individuals from $L_T$, and/or only those individuals that have shown low volatility. Other criteria will be apparent to the reader. The individuals also undergo further validation as part of this further selection criteria, by testing on historical data not part of training data 114. The individuals selected by the gene harvesting module 518 are written to the production gene population database 122 for use by production system 112 as previously described.

As mentioned, competition module 514 manages graduation of individuals from lower layers in the candidate gene pool 116, up to higher layers. This process can be thought of as occurring one individual at a time, as follows. In one embodiment, first, a loop is begun through all active individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. If the target experience layer is not already at quota, then the individual is simply moved into that experience level. If the target layer is full, then the competition module 514 determines whether the fitness estimate of the current individual exceeds that of the least fit individual in the target layer. If so, then the least fit individual is discarded, and the current individual is moved up into the target layer. If not, then the current individual is discarded. Regardless of whether the current individual is discarded in this process. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results.

Figure 10:
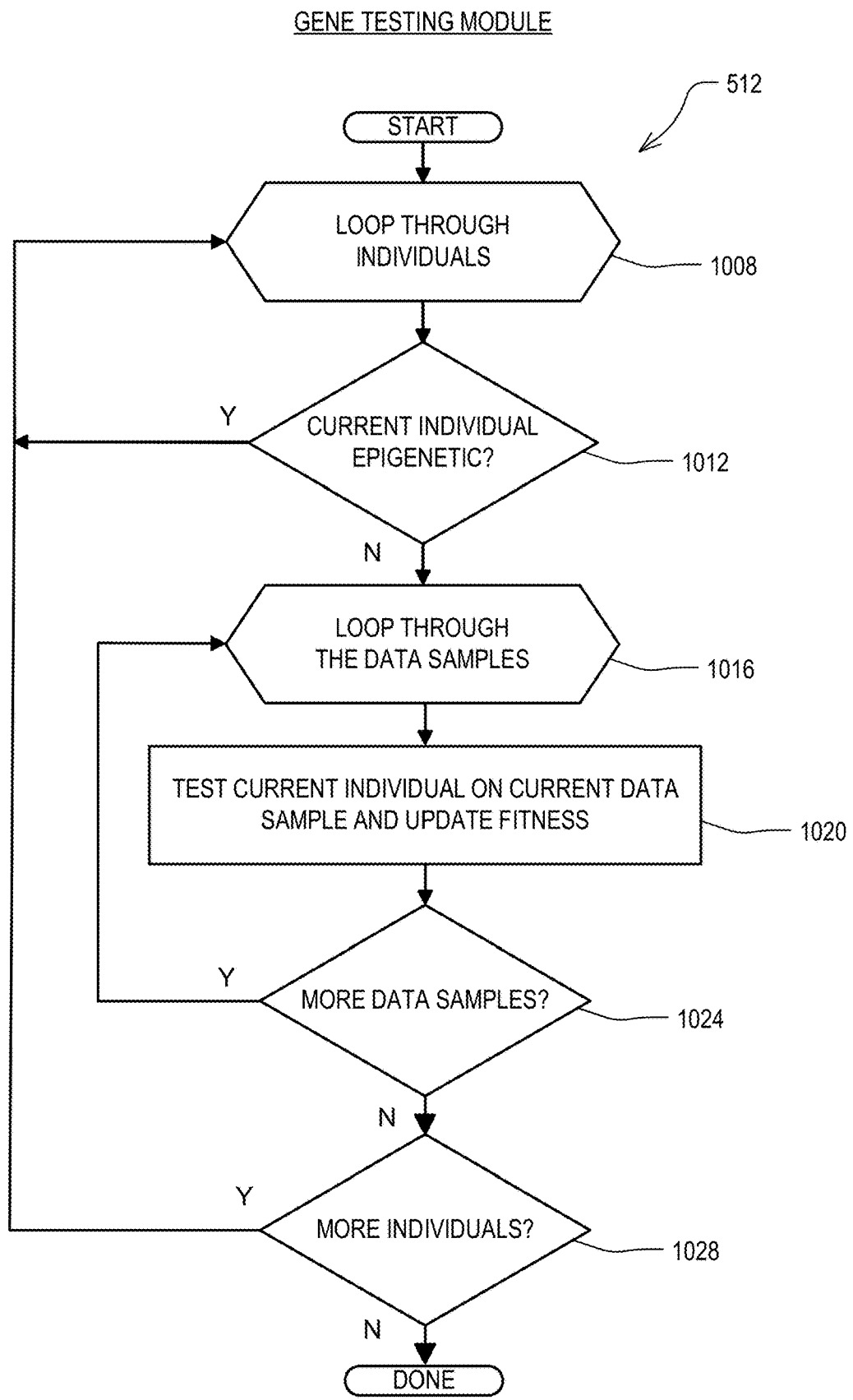
FIG. 10 illustrates a method of operation of the gene testing module in FIG. 5.

FIG. 10 is a flowchart which illustrates a bulk-oriented method of operation of gene testing module 512. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

In step 1008 of the flowchart 512 of the gene testing module shown in FIG. 10, a loop iterates over all individuals in the candidate gene pool 116. One individual is checked per iteration to determine whether the current individual is epigenetic or not in step 1012. If the current individual is epigenetic, it is skipped and control goes back to step 1008 to select a next individual. If the current individual is not epigenetic i.e. it is an active individual, then this individual is tested for all data samples. The loop in step 1016 iterates through all the data samples one by one. The current individual is tested for the current data sample at step 1020 and fitness of the current individual is updated. A step 1024 checks if there are more data samples for testing the current individual. If true, control shifts back to step 1016 to select the next data sample. If there are no more data samples, control transfers to a step 1028 to check if there are more individuals in the candidate gene pool. If true, the control transfers to step 1008, which selects the next individual for testing. When all active individuals are tested against all data samples, the condition at step 1028 becomes false and processing of individuals in gene testing module ends.

Figure 6:
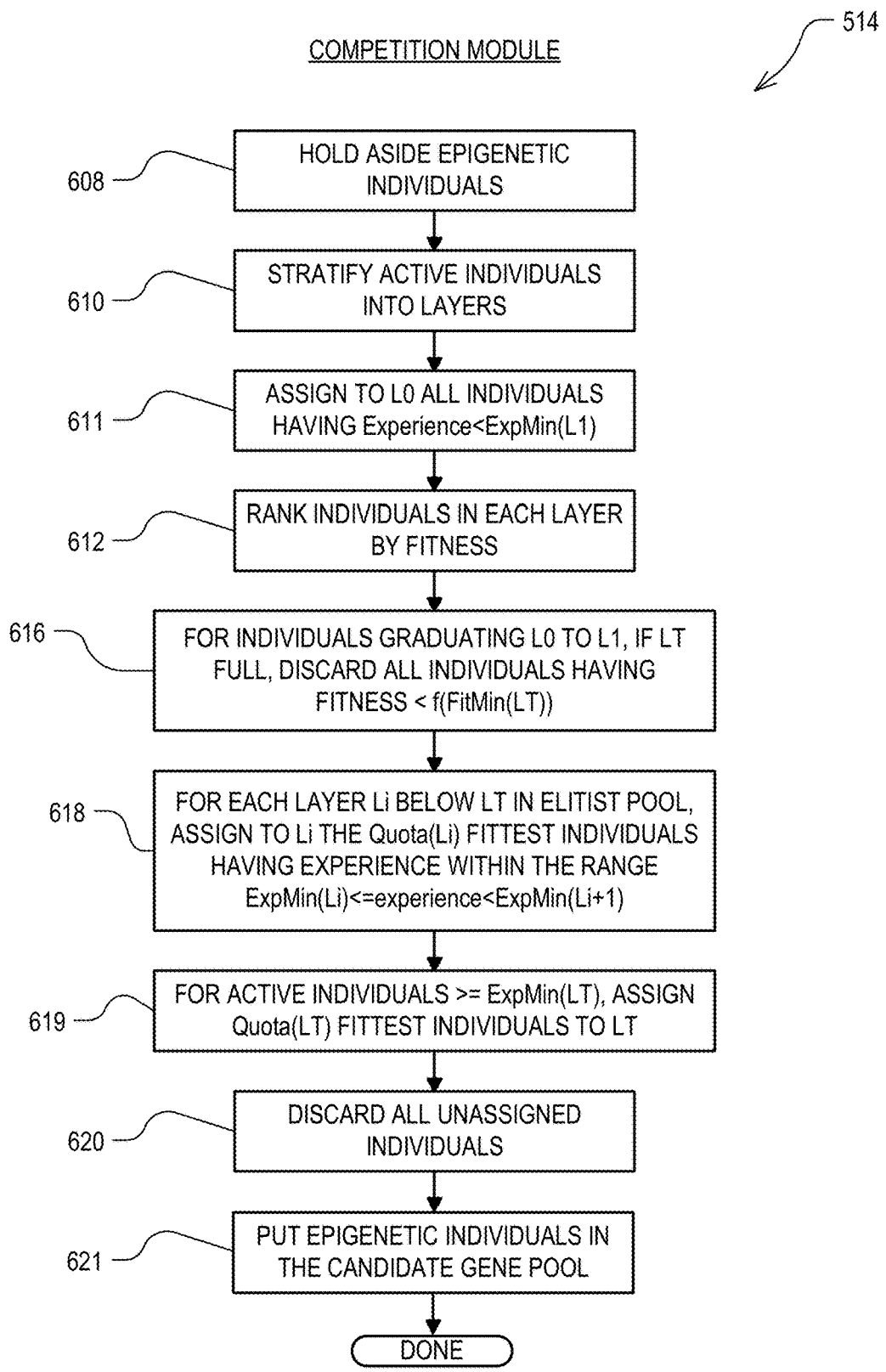
FIG. 6 illustrates a method of operation of the competition module in FIG. 5.

In the embodiment of FIG. 6, the layers in the candidate gene pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance". Epigenetic individuals are not compared to other individuals.

In step 608, epigenetic individuals are separated from active individuals in the candidate gene pool 116. The processing in subsequent steps of the competition module 514 is performed on active individuals.

In step 610, all active individuals in candidate gene pool 116 are stratified into their experience layers. In step 611, all active individuals whose experience level is still within that of $L_0$, are assigned automatically to $L_0$. In step 612, within each experience layer $L_1$-$L_T$, the active individuals are ranked according to their fitness estimates.

Step 616 implements the policy that once $L_T$ is full, no individuals are allowed into the elitist pool 118 unless they are at least as fit as some predetermined function f( ) of the top layer minimum fitness. In step 616, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent.

In step 618, for each layer $L_i$ below the top layer $L_T$, all active individuals in the elitist gene pool 118 having experience level within the range associated with layer $L_i$ are considered. Of these individuals, only the Quota($L_i$) fittest individuals are assigned to layer $L_i$. Note that some active individuals may well be left unassigned in this step. In step 619, of those individuals whose experience level is at least equal to the minimum experience level of the top layer of the elitist pool 118, the Quota($L_T$) fittest are assigned to $L_T$. This step can leave unassigned even some individuals with top layer experience, as individuals coming up from layer $L_{T-1}$ can supplant less fit individuals that were previously in $L_T$. In step 620, all active individuals remaining in elitist gene pool 118 which were not assigned to specific layers in steps 611, 618 or 619, are discarded. In step 621, all epigenetic individuals that were separated in step 608 are put back in the candidate gene pool 116. Epigenetic individuals do not participate in the competition as described for active individuals in steps 610 to 620 of the flowchart 514 of FIG. 6. All epigenetic individuals get a "free pass" and are retained in the candidate gene pool.

As used herein, a phrase such as "only the five fittest individuals", need not necessarily fill all five places. That is, if there are only three active individuals to consider, the phrase is satisfied if all three individuals are assigned places. Thus it can be seen that step 618 includes both a policy that active individuals entering a layer that is already at quota must compete for their place in that layer, as well as a policy that active individuals entering a layer that is not yet full are promoted to that layer automatically. It can also be seen that steps 618 and 620 together implement a policy that fitness comparisons are made only among active individuals having roughly the same experience.

Figure 11:
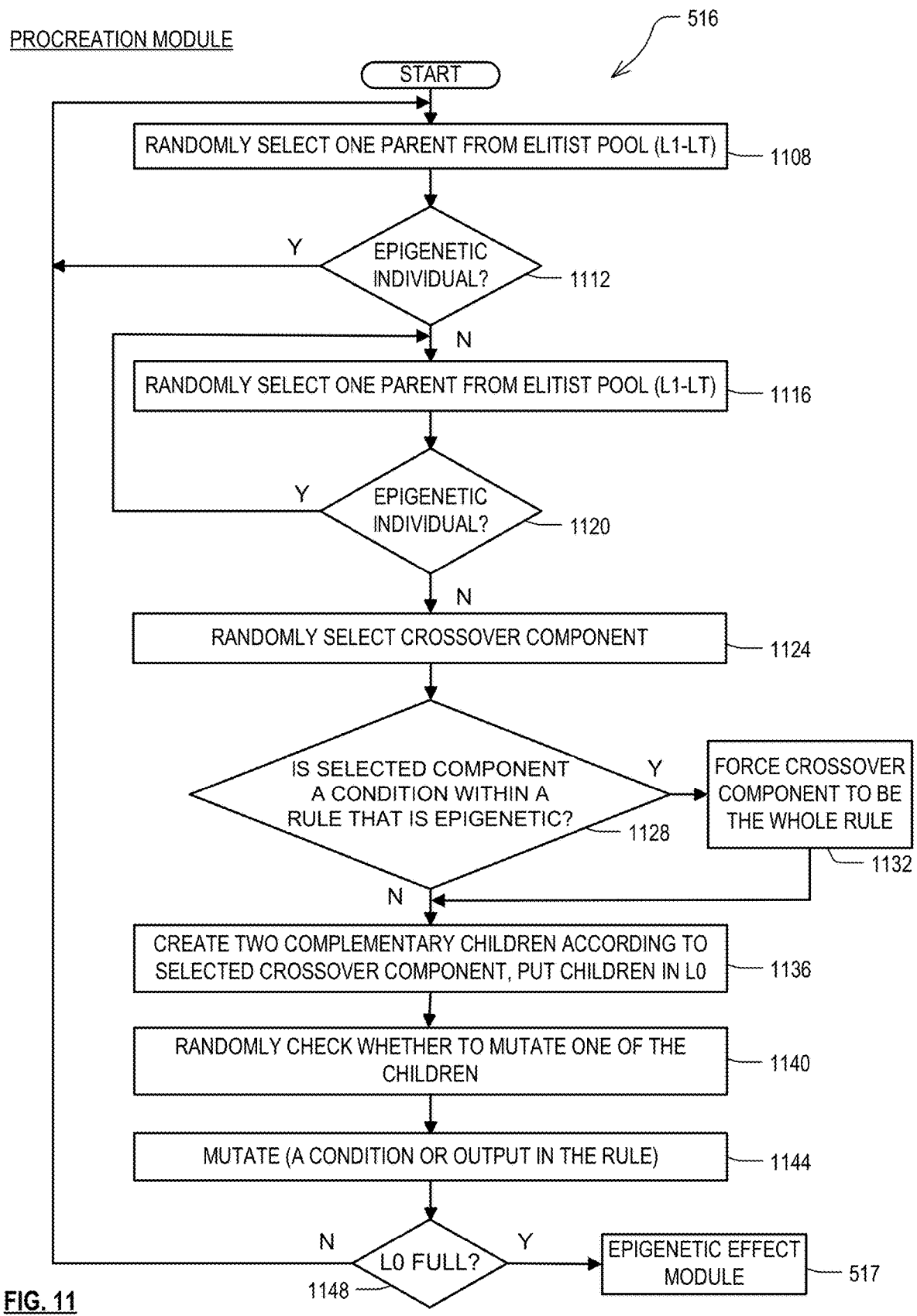
FIG. 11 illustrates a method of operation of the procreation module in FIG. 5.

FIG. 11 is a flowchart which illustrates a bulk-oriented method of operation of procreation module 516. In step 1108, one parent is selected from the elitist pool ($L_1$-$L_T$) to participate in procreation as a first parent. In step 1112, it is determined if the parent is epigenetic. If the selected parent is epigenetic, control is transferred to step 1108 to randomly select another individual to participate as the first parent. If the selected individual is not epigenetic, a second parent is selected at step 1116 from the elitist pool ($L_1$-$L_T$). At step 1120, the second individual is checked to determine whether it is epigenetic or not. If the selected second parent is epigenetic, control transfers to step 1116 to select another individual as the second parent. Otherwise, if the selected individual is not epigenetic, control transfers to step 1124 in which a component is randomly selected in the parents for crossover. In step 1128, it is checked whether the selected component is a condition within an epigenetic rule. If true, the crossover component is forced to be the entire rule in step 1132. If the selected component is not a condition within a rule that is epigenetic, the selected component is used as crossover component. Since individuals are randomly selected as parents at steps 1108 and 1116 therefore, an individual may be selected in more than one crossover.

In step 1136, two complementary children are created according to the selected crossover component. The newly created children are placed in layer $L_0$ of the candidate gene pool 116. These children do not have any experiences as they have not been subjected to testing by the gene testing module 512. In step 1140, one of the children is selected by random chance for mutation. In step 1144, a mutation operation is performed on the selected individual which can include making a change in the condition or output of the selected rule. At decision step 1148, it is checked whether the layer $L_0$ of the candidate gene pool 116 is full. If not, then control transfers to step 1108, otherwise, control transfers to epigenetic effect module 517.

Figure 12:
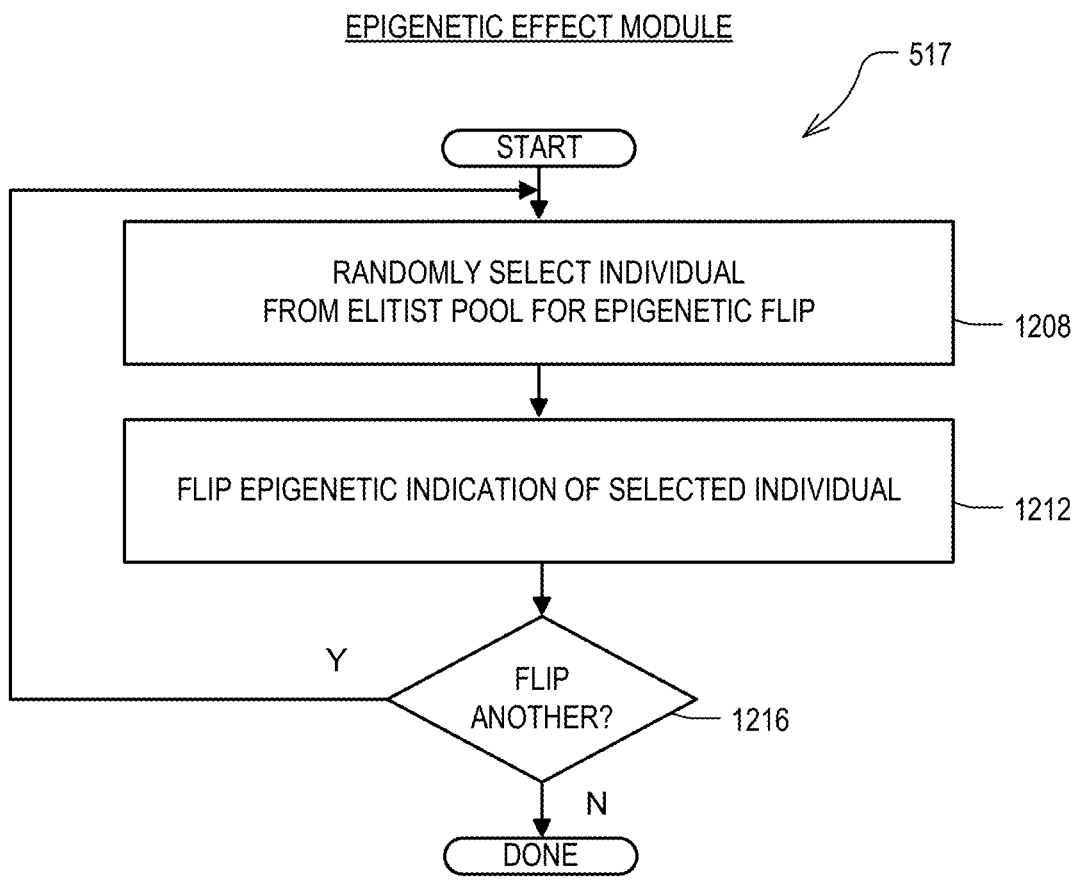
FIG. 12 illustrates a method of operation of the epigenetic effect module contained inside the procreation module in FIG. 5.

FIG. 12 is a flowchart 517 which illustrates a bulk-oriented method of operation of the epigenetic effect module 517. In step 1208, an individual is randomly selected from elitist pool for epigenetic flip. In step 1212, the epigenetic indication 317A of the selected individual is flipped. If the selected individual in step 1208 is an active individual, after the flip in step 1212, the individual becomes epigenetic. Similarly, if the selected individual in step 1208 is epigenetic, it becomes active after the flip in step 1212. In a decision step 1216, it is determined if epigenetic indication 317A of another individual needs to be flipped. If true, control transfers to step 1208 and the process is repeated otherwise, the process completes. As described earlier, in an embodiment in which epigenetic indication designates part or all of the individual as epigenetic, at the step 1212, the epigenetic indication can be flipped at different levels, e.g., at individual-level, rule-level, and condition-level. For example, if an active individual is selected at step 1208, the epigenetic indication of a condition in one of the rules of the selected individual can be flipped to designate the condition as epigenetic. In a further embodiment, if the individual selected at step 1208 is epigenetic at the individual-level, the epigenetic indication at only the individual-level is flipped. The epigenetic indications of smaller granularity components (such as rules and conditions) of an epigenetic designated individual are not flipped.

Figure 7:
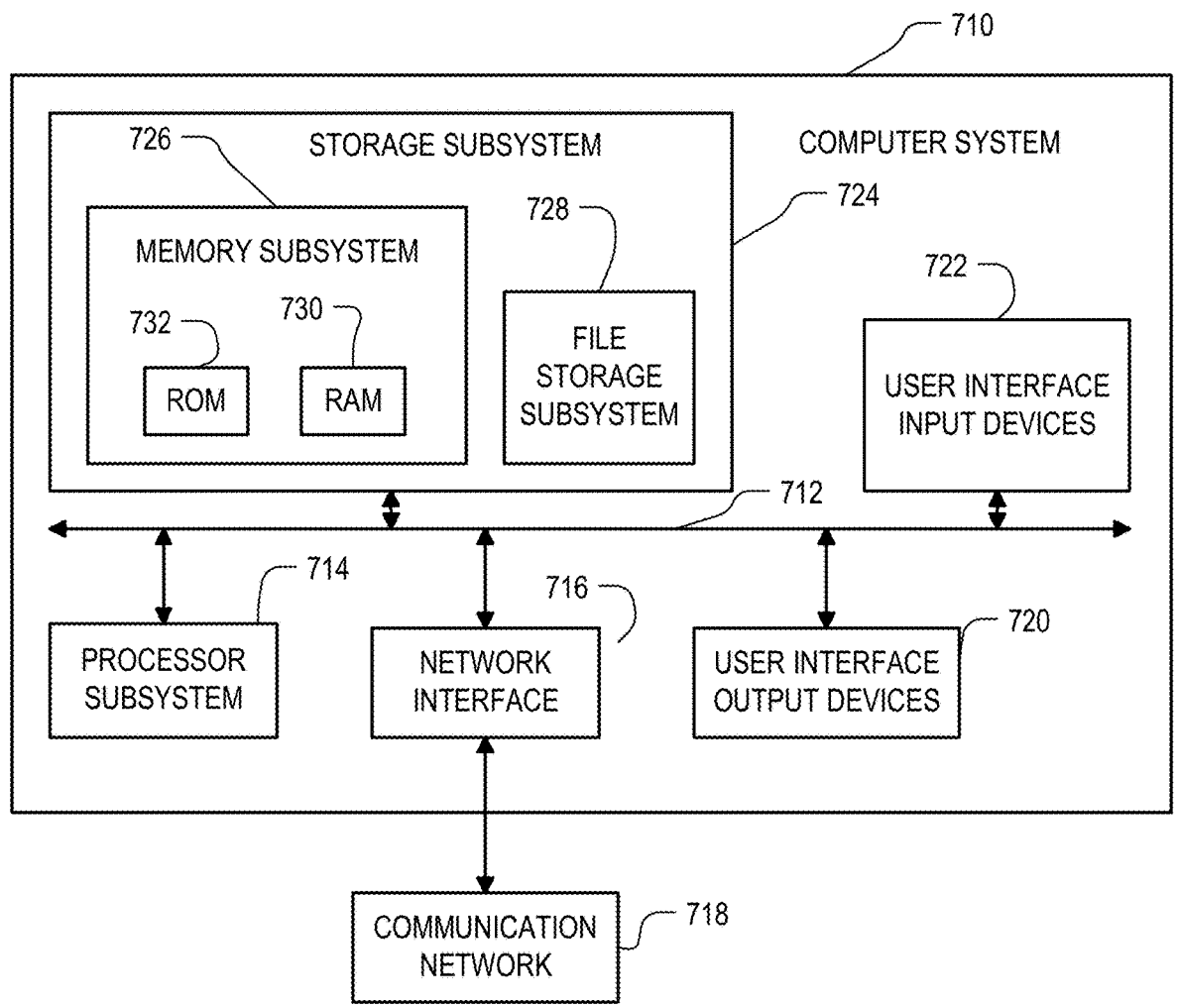
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate gene pool 116, the training database 114, and/or the production gene population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an active individual's fitness can be voluminous. Therefore, even with modern high processing power and large memory capacity computers, achieving quality results within a reasonable time is often not feasible on a single machine. A large gene pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse gene pool so as to increase the probability of finding fitter individuals. In the client/server embodiment, the gene pool is distributed over a multitude of clients for evaluation. Each client continues to evaluate its own client-centric gene pool using data from training database 114, which it may receive in bulk or periodically on a sustained and continuing basis. Individuals that satisfy one or more predefined conditions on a client computer are transmitted to the server to form part of a server-centric gene pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for an individual is transferred back to the server. The server merges the partial evaluation results of an individual with that individual's fitness estimate at the time it was sent to the clients to arrive at an updated fitness estimate for that individual in the server-centric gene pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric gene pool which need not match each other's or the server-centric gene pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
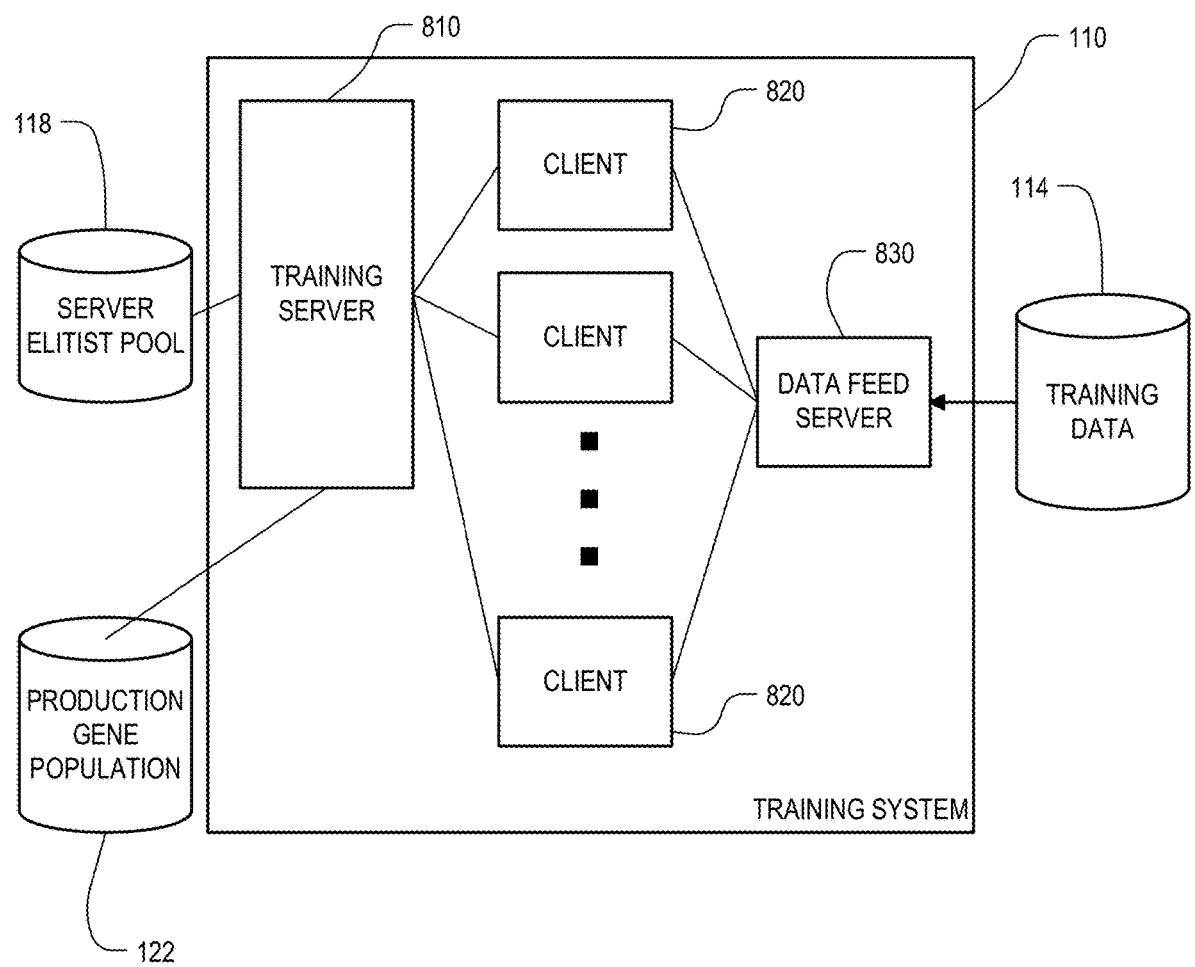
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810.

Figure 9:
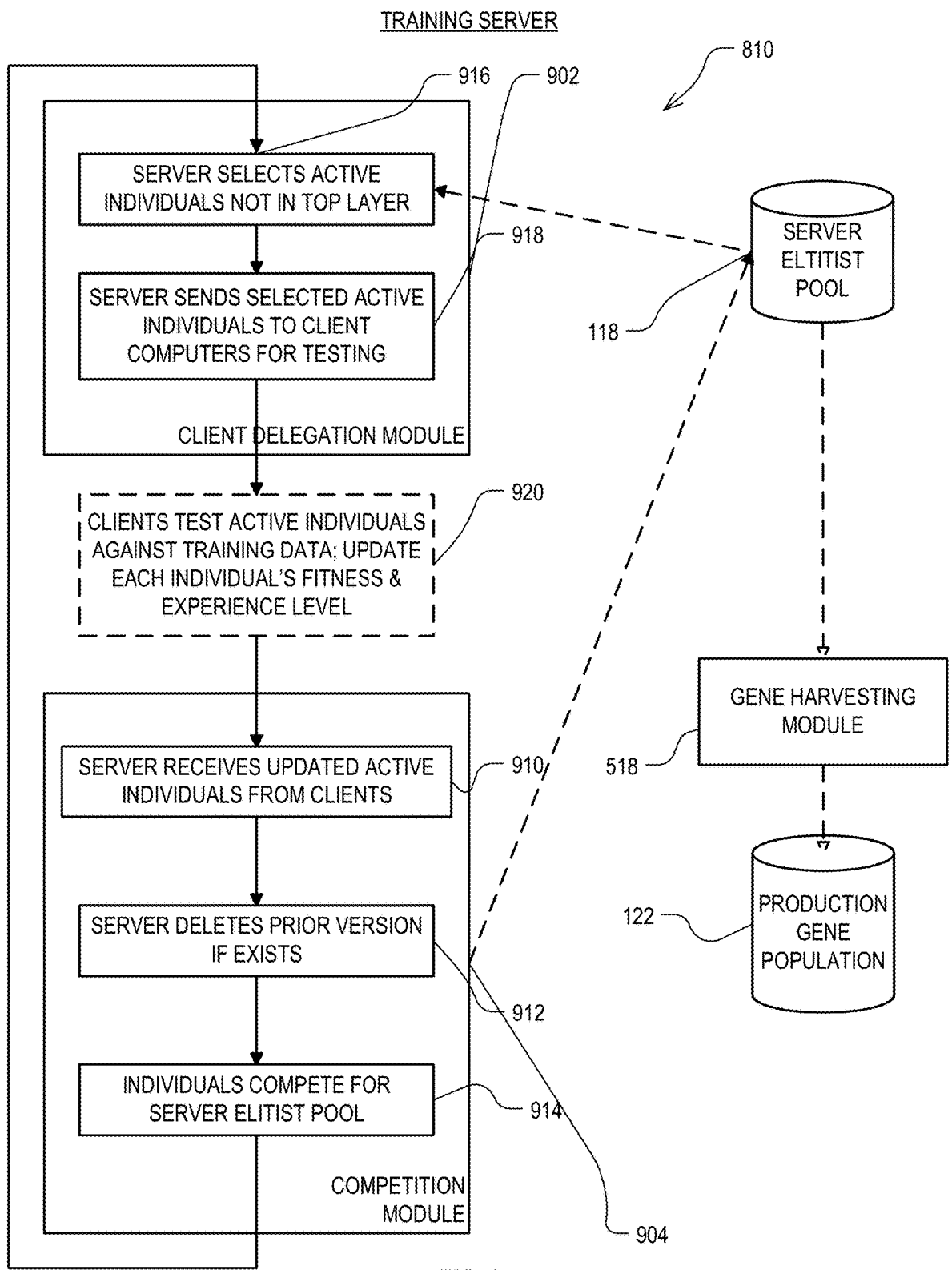
FIG. 9 illustrates modules that can be used to implement the functionality of training server of FIG. 8.

FIG. 9 illustrates various modules that can be used to implement the functionality of training server 810 (FIG. 8). Elitist pool 118 and production gene population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself. It does, however, enforce competition within its own server-centric elitist pool 118 when individuals are returned from clients. In particular, the server-centric elitist pool 118 includes both active and epigenetic individuals as set forth above. FIG. 9 illustrates various modules that can be used to implement the functionality of training server 810. Like the embodiment of FIG. 5, the training server 810 includes a competition module 904. It also includes gene harvesting module 518, which may be same as in FIG. 5. It also includes gene testing and procreation functionality, but these are combined into a single client delegation module 902 in FIG. 9. The client delegation module 902 and the competition module 904 constitute two sub-modules in a gene pool processor module (not shown specifically in FIG. 9). The FIG. 9 embodiment does not include a pool initialization module in the sense of FIG. 5, since as mentioned, the clients initialize their own individual pools.

In step 910, the competition module 904 receives active individuals from one or more of the client computers 820. These individuals may arrive asynchronously, if and when client computers have them available to transmit. They may arrive out-of-order, and some individuals previously sent out for testing may never return. Individuals may arrive individually, or in bunches. At various times determined by competition module 904, after at least one active individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 replaces its prior copy of the individual with the one newly received. This step may involve merely updating the experience level and the fitness estimation of the prior copy of the individual in the server-centric elitist pool 118. If in step 912, the competition module 904 determines that the incoming individual is a new one, then in step 914 the incoming individual competes for its position in the server elitist pool 118. The same rules of competition apply here as they do for the competition module 514 in the server-only model. That is, depending on the embodiment, the fitness estimate of the incoming individual may be compared to the least fit individual in the now-appropriate experience layer for the incoming individual, and only the fitter of the two is retained. The other is discarded. An elitist pool minimum fitness policy can be applied here as well in some embodiments, based on a server-centric minimum fitness level. Alternatively, the entire server elitist pool 118 can be disbanded and reconstituted at each competition event, as described in more detail with respect to FIG. 6.

In the client delegation module 902, in step 916, the server 810 selects active individuals from the server-centric elitist pool 118, and sends them out to one or more clients 820 for further testing (step 918). As in the server-only embodiment, the client delegation module 902 is restricted from selecting for further testing active individuals already in the top layer of the elitist pool 118. In one embodiment, the battery of trials that an active individual is to undergo is dictated by the training server. In such an embodiment, the server-centric view of the battery is the same as the client-centric view of the battery. In another embodiment, the battery of trials that an active individual is to undergo is left to the client to decide, and client may perform more than one battery of trials on the individual before returning it to the server. In the latter embodiment, the client has its own client-centric view of a testing battery, and the server-centric view of the battery is unimportant.

In step 920 the client machines 820 test the active individuals against training data from the data feed server 830, and update each individual's fitness and experience level locally. For each active individual being tested the client machine 820 checks the epigenetic conditions of the components. The epigenetic components are ignored in testing. In one embodiment, the active individuals contain rules which further contain conditions. Epigenetic rules of active individual are ignored in testing. In one embodiment, in which rule outputs are combined when they "fire", a rule designated as epigenetic is precluded from firing. In an embodiment in which conditions in an active rule are combined conjunctively, an epigenetic condition in an active rule is ignored by forcing it to True. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. The candidate gene pool 116 in a client computer 820 is client-centric, and includes all candidate individuals being considered by the clients, including those that do not yet have sufficient experience to be considered for the elitist pool in the client computer. The candidate gene pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric gene pool, including the number of layers, need be the same as their corresponding parameters in other clients or in the server. Preferably the candidate gene pool 116 in the client computers 820 are implemented using linked lists, whereas the elitist pool 118 in the server 810 are implemented using a DBMS, both as previously described.

Unlike the single server embodiment, the gene testing module in the client computer 820 does not prevent further testing of individuals that have reached the top layer $CL_{CT}$ of the client-centric elitist pool 820. The gene harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A computer-implemented system for evolving solutions to a provided problem, for use with a training database containing training data samples for an environment of the problem, comprising:
 a memory storing a database having a candidate pool comprising a set of candidate individuals to solve the problem, each candidate individual identifying a plurality of conditions and at least one corresponding consequence to be asserted in dependence upon the conditions, each candidate individual further having associated therewith an indication of a respective fitness estimate indicating a level of success in solving the problem, and an epigenetic indication indicating epigenetic status of at least part of the candidate individual; and
 a candidate pool processor which:
  tests individuals from the candidate pool on the training data, each individual being tested undergoing a respective battery of at least one trial, each trial applying the conditions of the respective individual to the training data to assert a consequence, ignoring epigenetic-designated parts of individuals,
  updates the fitness estimate associated with each of the individuals being tested in dependence upon the training data and consequences asserted by the individuals in the testing on the battery of trials,
  holds competition events in which an individual from the candidate pool is selected for discarding from the candidate pool in dependence upon a predetermined criteria, and
  with a non-zero probability, removes an epigenetic designation of all or part of one of the individuals in the candidate pool,
 wherein the candidate pool processor further includes a procreation module which forms child individuals in dependence upon a respective set of at least one parent individual from the candidate pool, each child individual being a member of the group consisting of:
  an individual having conditions from each of its parent individuals, and
  an individual having a randomly mutated condition from one of its parent individuals.

2. The system of claim 1, wherein the epigenetic indication designates a particular one of the candidate individuals as a whole as epigenetic.

3. The system of claim 1, wherein the epigenetic indication for a particular one of the candidate individuals designates which if any conditions of the particular candidate individual is epigenetic.

4. The system of claim 1, wherein a particular one of the candidate individuals includes at least one rule and each of the rules includes at least one condition,
 and wherein the epigenetic indication is a rule-level epigenetic indication that designates which if any rules of the particular candidate individual is epigenetic.

5. The system of claim 4, wherein the particular candidate individual further has a condition-level epigenetic indication indicating which if any conditions of the particular candidate individual is epigenetic, and wherein the candidate individual further has an individual-level epigenetic indication indicating whether the particular candidate individual as a whole is epigenetic.

6. The system of claim 4, wherein the rule-level epigenetic indication indicates that a particular rule of the particular candidate individual is epigenetic, wherein a second one of the candidate individuals has associated therewith:
a rule-level epigenetic indication indicating which if any rules of the second candidate individual is epigenetic;
a condition-level epigenetic indication indicating which if any conditions of the second candidate individual is epigenetic; and
an individual-level epigenetic indication indicating whether the second candidate individual as a whole is epigenetic,
and wherein the condition-level epigenetic indication of the second candidate individual indicates that a particular condition of the second candidate individual is epigenetic.

7. The system of claim 1, wherein in testing individuals from the candidate pool on the training data, the candidate pool processor:
detects whether a particular one of the candidate individuals is designated epigenetic; and
tests the particular individual on the training data only if the individual is not designated epigenetic.

8. The system of claim 1, wherein the non-zero probability is predetermined and is between 0 and 1 exclusive.

9. The system of claim 1 wherein the candidate pool processor further includes a controller which performs a sequence in which the candidate pool processor tests the individuals on a first one of the batteries of trials and updates the fitness estimates, then subsequently holds one or more of the competition events, then subsequently forms the child individuals, then repeats the sequence.

10. The system of claim 9, wherein the sequence further includes removing the epigenetic designation, with the non-zero probability and after the forming of child individuals and before the first one of the competition events in the repetition of the sequence.

11. The system of claim 1, wherein the candidate pool processor, with a predetermined probability between 0 and 1 exclusive, adds an epigenetic designation to all or part of one of the individuals in the candidate pool.

12. The system of claim 1, wherein the procreation module further includes an epigenetic effect module which flips the epigenetic designation of a randomly selected individual from the candidate pool.

13. The system of claim 1, wherein with a predetermined probability between 0 and 1 exclusive, the candidate pool processor removes an epigenetic designation of one of the candidate individuals.

14. The system of claim 1, wherein the procreation module ignores individuals designated epigenetic when selecting the parent individual from the candidate pool.

15. The system of claim 1, wherein a particular one of the candidate individuals includes at least one rule and each of the rules includes at least one condition and an epigenetic indication indicating whether the rule is epigenetic, wherein a particular one of the rules is designated epigenetic,
and wherein forming child individuals in dependence upon a respective set of at least one parent individual includes copying into one of the child individuals the entire particular rule.

16. The system of claim 15, wherein in forming child individuals in dependence upon a respective set of at least one parent individual from the candidate pool, none of the child individuals includes fewer than all of the conditions of an epigenetic-designated rule from one of its parent individuals.

17. The system of claim 16, wherein in forming child individuals in dependence upon a respective set of at least one parent individual from the candidate pool, one of the child individuals includes fewer than all of the conditions of a rule not designated epigenetic, from one of its parent individuals.

18. The system of claim 1, wherein a particular one of the candidate individuals includes a particular one of the conditions designated epigenetic, and wherein forming child individuals in dependence upon a respective set of at least one parent individual includes copying into one of the child individuals the particular condition.

19. A method for evolving solutions to a provided problem, the method including:

storing a database having a candidate pool comprising a set of individuals, each candidate individual identifying a candidate solution to the problem and identifying a plurality of conditions and at least one corresponding consequence to be asserted in dependence upon the conditions, each candidate individual further having associated therewith an indication of a respective fitness estimate indicating a level of success in solving the problem, and an epigenetic indication indicating epigenetic status of at least part of the candidate individual; and performing candidate pool processor steps of:
testing individuals from the candidate pool on the training data, each individual being tested undergoing a respective battery of at least one trial, each trial applying the conditions of the respective individual to the training data to assert a consequence, ignoring epigenetic-designated parts of individuals,
updating the fitness estimate associated with each of the individuals being tested in dependence upon the training data and consequences asserted by the individuals in the testing on the battery of trials,
holding competition events in which an individual from the candidate pool is selected for discarding from the candidate pool in dependence upon a predetermined criteria,
with a non-zero probability, removing an epigenetic designation of all or part of one of the individuals in the candidate pool, and
forming child individuals in dependence upon a respective set of at least one parent individual from the candidate pool, each child individual being a member of the group consisting of:
an individual having conditions from each of its parent individuals, and
an individual having a randomly mutated condition from one of its parent individuals.

20. A non-transitory computer readable storage medium impressed with computer program instructions which, when executed on a processor, implement a method comprising:

storing a database having a candidate pool comprising a set of individuals, each candidate individual identifying a plurality of conditions and at least one corresponding consequence to be asserted in dependence upon the conditions, each candidate individual further having associated therewith an indication of a respective fitness estimate, and an epigenetic indication indicating epigenetic status of at least part of the candidate individual as epigenetic;

implementing a candidate pool processor to perform operations comprising:
  testing individuals from the candidate pool on the training data, each individual being tested undergoing a respective battery of at least one trial, each trial applying the conditions of the respective individual to the training data to assert a consequence, ignoring epigenetic-designated parts of individuals,
  updating the fitness estimate associated with each of the individuals being tested in dependence upon the training data and consequences asserted by the individuals in the testing on the battery of trials,
  holding competition events in which an individual from the candidate pool is selected for discarding from the candidate pool in dependence upon a predetermined criteria,
  with a non-zero probability, removing an epigenetic designation of all or part of one of the individuals in the candidate pool, and
  forming child individuals in dependence upon a respective set of at least one parent individual from the candidate pool, each child individual being a member of the group consisting of:
    an individual having conditions from each of its parent individuals, and
    an individual having a randomly mutated condition from one of its parent individuals.

* * * * *